(12) United States Patent
Taniguchi et al.

(10) Patent No.: US 7,346,190 B2
(45) Date of Patent: Mar. 18, 2008

(54) TRAFFIC LINE RECOGNITION DEVICE

(75) Inventors: Hiroyasu Taniguchi, Tokyo (JP); Manabu Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 670 days.

(21) Appl. No.: 10/912,101

(22) Filed: Aug. 6, 2004

(65) Prior Publication Data
US 2005/0196019 A1 Sep. 8, 2005

(30) Foreign Application Priority Data
Mar. 8, 2004 (JP) .............................. 2004-064380

(51) Int. Cl.
*G06K 9/00* (2006.01)
*H04N 7/00* (2006.01)

(52) U.S. Cl. .................... 382/104; 348/113; 340/907; 701/23

(58) Field of Classification Search ........ 382/104–105; 348/113–120; 340/907–943; 701/23–28, 701/300–302
See application file for complete search history.

(56) References Cited

U.S. PATENT DOCUMENTS 5,555,555 A * 9/1996 Sato et al. ................. 382/104
6,970,605 B1 * 11/2005 Kondo et al. .............. 382/254
2002/0159616 A1 * 10/2002 Ohta ......................... 382/104

FOREIGN PATENT DOCUMENTS

| EP | 1 304 607 A1 | 4/2003 |
|---|---|---|
| JP | 11-085999 | 3/1999 |
| JP | 2003-123058 | 4/2003 |

* cited by examiner

*Primary Examiner*—Aaron W Carter
(74) *Attorney, Agent, or Firm*—Leydig, Voit & Mayer, Ltd.

(57) ABSTRACT

A traffic line recognition device includes: a traffic line region candidate extraction section that extracts a traffic line candidate, as a traffic line candidate, from a road image obtained by a TV camera installed on a vehicle; a two dimension/three dimension transform section that transforms two dimensional image coordinates of a pixel contained in the traffic line region candidate into three dimensional coordinates; a histogram production section that accumulates and projects the three dimensional coordinates onto a coordinate system in a direction crossing a road and produces a histogram in the direction crossing the road; and a traffic line judgment unit determines a traffic line based on that histogram.

4 Claims, 7 Drawing Sheets

TRAFFIC LINE RECOGNITION DEVICE

BACKGROUND OF THE INVENTION

1. Field of the Invention

The present invention relates to a traffic line recognition device for recognizing traffic lines between which a vehicle runs.

2. Description of the Related Art

In a conventional traffic line recognition device, for example, as disclosed in a patent document 1, a Hough transformation has been used at the time of finding a white line on a road. Moreover, in addition to a method of using such a Hough transformation, for example, as disclosed in a patent document 2, in order to respond to different kinds of traffic lines such as ordinary white line and traffic line made by Botts' dots, there has been proposed a traffic line recognition device using different processing methods for the respective different kinds of traffic lines.

[Patent document 1] Japanese Unexamined Patent Publication No. 11-85999

[Patent document 1] Japanese Unexamined Patent Publication No. 2003-123058

However, among the conventional traffic line recognition devices, a traffic line recognition device using the Hough transformation needs a processing unit of high performance because of heavy processing load. Hence, the device by this method causes a problem of increasing the cost of device.

On the other hand, a traffic line recognition device employing different methods for the white line and the Botts' dots needs a large amount of resources such as memory. Hence, the device employing such methods also is not a desirable one as a device mounted on a vehicle.

SUMMARY OF THE INVENTION

The present invention has been made to solve the above described problems. The object of the present invention is to realize a traffic line recognition device capable of responding to different kinds of traffic lines such as ordinary white lines and Botts' dots without requiring a processing unit of high performance and a large amount of resources.

A traffic line recognition device in accordance with the present invention is constructed in the following manner: a traffic line region candidate extraction section extracts a traffic line region candidate to become a traffic line from a road image obtained by a TV camera installed in a vehicle; a two dimensions/three dimensions transform section transforms two dimensional image coordinates of a pixel contained in the traffic line region candidate to three dimensional coordinates; a histogram production section accumulates and projects the three dimensional coordinates to a coordinate system in a direction crossing a road and produces a histogram in the direction crossing the road; and a traffic line judgment unit determines a traffic line on the basis of the value of the histogram.

The traffic line recognition device of the present invention is so constructed as to convert pixels included in the traffic line region candidate into three dimensional coordinates and to produce a histogram acquired by accumulating and projecting the three dimensional coordinates to the coordinate system in the direction crossing the road and to determine a traffic line on the basis of the value of this histogram. Therefore, this can provide a device capable of recognizing a traffic line even in a road having different kinds of traffic lines such as white lines and Botts' dots without requiring a processing unit of high performance and a large amount of resources.

DETAILED DESCRIPTION OF THE PREFERRED EMBODIMENT

Embodiment 1

Figure 1:
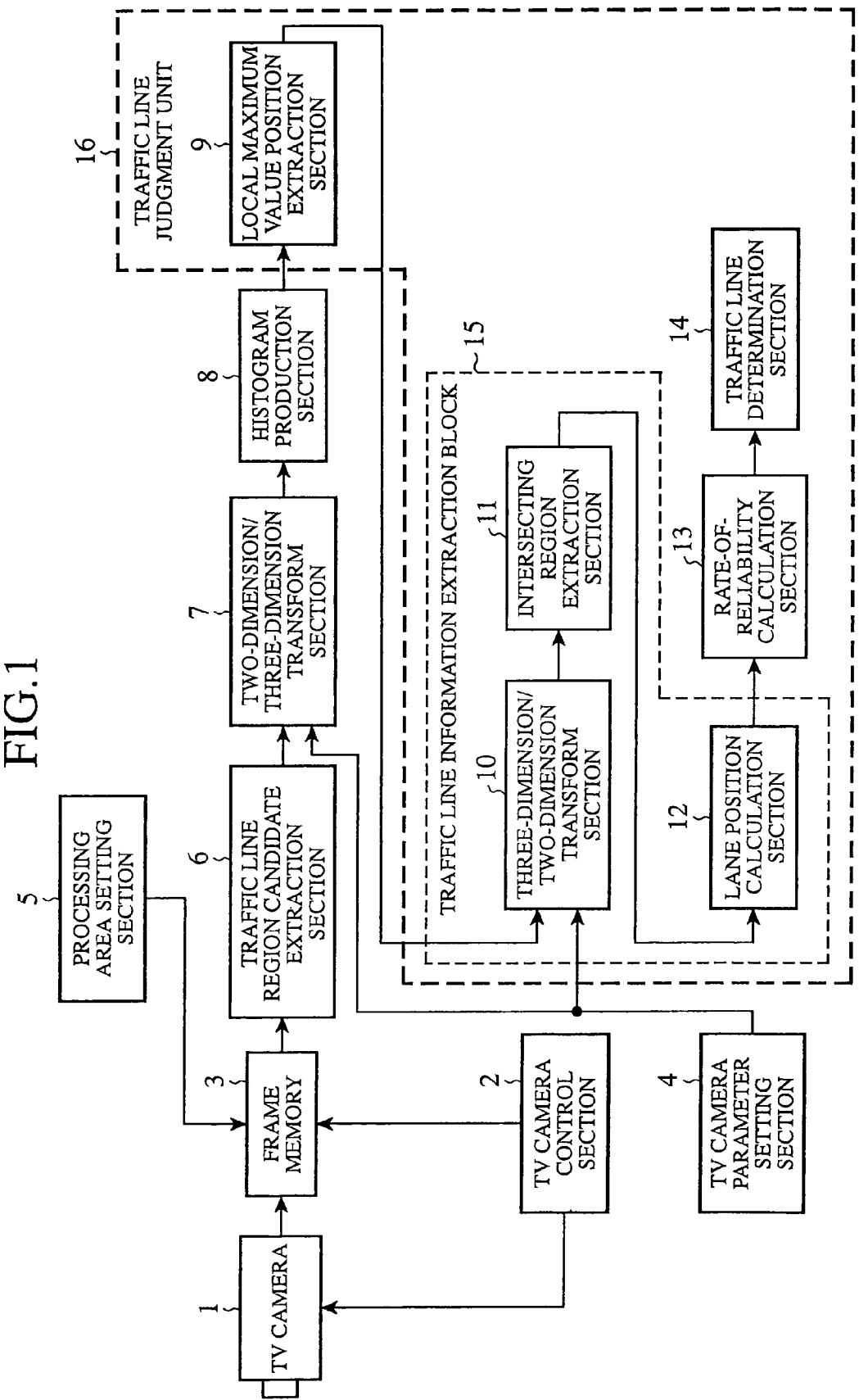
FIG. 1 is a block diagram to show a traffic line recognition device in accordance with embodiment 1 of the present invention.

FIG. 1 is a block diagram to show a traffic line recognition device in accordance with embodiment 1 of the present invention.

Figure 2:
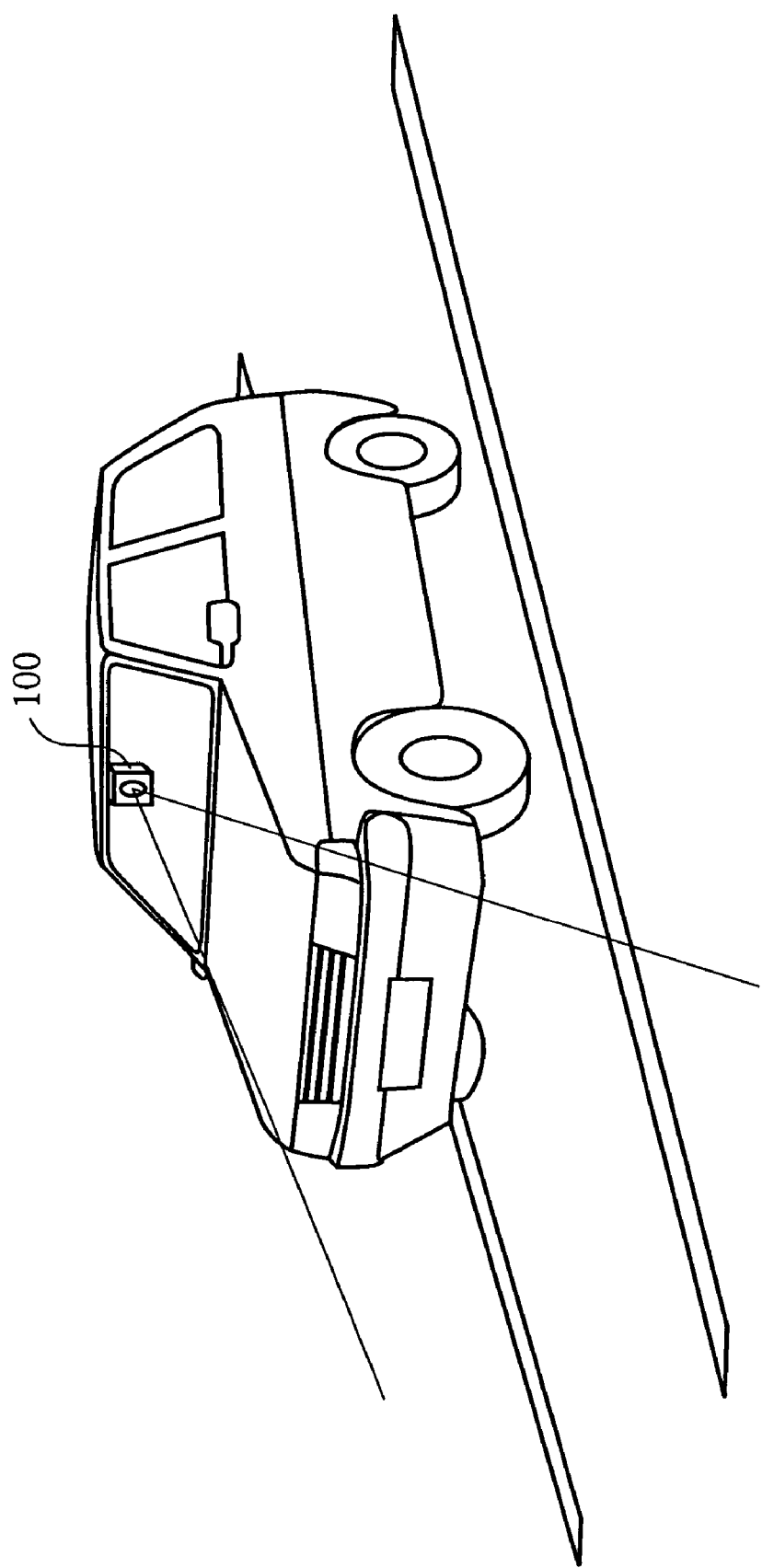
FIG. 2 is an illustration to show a state where the traffic line recognition device in accordance with embodiment 1 of the present invention is mounted.

FIG. 2 is an illustration to show a state where the traffic line recognition device in accordance with embodiment 1 of the present invention is mounted.

In these drawings, a traffic line recognition device 100 includes a TV camera 1, a TV camera control section 2, a frame memory 3, a TV camera parameter setting section 4, a processing area setting section 5, a traffic line region candidate extraction section 6, a two dimensions/three dimensions transform section 7, a histogram production section 8, a local maximum value position extraction section 9, a three dimensions/two dimensions transform section 10, an intersection region extraction section 11, a traffic line position calculation section 12, a rate of reliability calculation section 13, and a traffic line determination section 14. At this point, a traffic line information extraction block 15 is constructed of from the three dimensions/two dimensions transform section 10 to the traffic line position calculation section 12, and a traffic line judgment unit 16 is construction of from the local maximum value position extraction section 9 to the traffic line determination section 14.

Further, the traffic line recognition device 100 of this embodiment is mounted on the inside of front window of a vehicle, for example, in such a way as to be integral with a room mirror, and the TV camera 1 obtains an image of a road surface in front of the vehicle through the front window.

In FIG. 1, the TV camera 1 is a TV camera constructed of, for example, a CCD camera or the like and obtains an image in front of the vehicle at predetermined frame intervals according to control from the TV camera control section 2. The TV camera control section 2 is a control section for controlling the TV camera 1 and the frame memory 3. The frame memory 3 is a memory for storing one frame of digital data based on the image signal of TV camera 1.

The TV camera parameter setting section 4 is a function section for setting camera parameters of the camera of TV camera 1 those are manually or automatically input. That is, among the camera parameters, a camera element size, a screen size, a lens focal length, and an installation position (it is assumed that level, lateral position, and depth are zero) are fixed when the camera is installed and hence these values are previously set to the two dimensions/three dimensions transform section 7 and the three dimensions/two dimensions transform section 10. Further, a dip with respect to the road surface (it is assumed that an inclination other than the dip is zero) is fundamentally determined at the time of installation. However, when the vehicle is running, in a case where the slope of road surface varies, the dip with respect to the road surface needs to be updated in response to the varying slope, and hence an updated value is calculated by finding a vanishing point which is an intersection of a plurality of traffic lines determined by the device. That is, the TV camera parameter setting section 4 is constructed in such a way as to automatically update a value of dip when the vehicle is running.

The processing area setting section 5 is a function section for setting a processing area to become an area in which traffic line recognition is performed, on a two dimensional image, and a function section for setting a predetermined area in front of the vehicle as the processing area.

The traffic line region candidate extraction section 6 is a function section for extracting a region to become a traffic line candidate from the processing area which the processing area setting section 5 sets for an image stored in the frame memory 3. The two dimensions/three dimensions transform section 7 is a function section for transforming a traffic line region candidate of two dimensional image which is extracted by the traffic line region candidate extraction section 6 in a three dimensional coordinate on the basis of the camera parameters set by the TV camera parameter setting section 4. The histogram production section 8 is a function section for producing a histogram relating to a coordinate value in a direction crossing the road for the data which is transformed to three dimensional data by the two dimensions/three dimensions transform section 7.

The local maximum value position extraction section 9 is a function section for extracting the position of a local maximum value from the histogram which is produced by the histogram producing section 8. The three dimensions/two dimensions transform section 10 is a function section for performing the transform of three dimensions to two dimensions so as to find coordinates on a screen for the local maximum value position which is found by the local maximum value position extraction section 9. The intersection region extraction section 11 is a function section for finding a traffic line region candidate which intersects with a straight line made by connecting two points on the screen corresponding to the respective local maximum value positions for each scanning line in the direction crossing the road and for extracting this traffic line region candidate as a constituent element of a line to be a traffic line candidate. The traffic line position calculation section 12 is a function section for finding a traffic line width as traffic line information on the basis of the intersection region which is found by the intersection region extraction section 11 and for finding the position and angle of the traffic line. The rate of reliability calculation section 13 is a function section for calculating a rate of comformability of the traffic line information which is found by the traffic line position calculation section 12 with the traffic line information which was acquired by the previous traffic line recognition processing, or the rate of comformability of the traffic line information found by the traffic line position calculation section 12 with a previously set traffic line model value, and for calculating a rate of reliability of traffic line by multiplying predetermined weights thereto. The traffic line determination section 14 is a function section for determining a pair of traffic line candidates having the rate of reliability that is more than a predetermined threshold value and the highest, as traffic lines between which the vehicle is running.

By this construction from the local maximum value position extraction section 9 to the traffic line determination section 14, the traffic line judgment unit 16 realizes a function of determining a traffic line on the basis of the value of histogram produced by the histogram production section 8.

Further, by this construction from the three dimensions/two dimensions transform section 10 to the traffic line determination section 12, the traffic line information extraction block 15 realizes a function of extracting a traffic line region candidate having an intersection as traffic line information on the basis of the presence or absence of the intersection of a traffic line candidate obtained by transforming a straight line, which corresponds to the local maximum value position found by the local maximum value position extraction section 9 and extends in parallel to the road, to two dimensional image coordinates and the traffic line region candidates for respective scanning lines in the direction crossing the road in the image, and realizes a function of extracting at least one or more pieces of information among a traffic line width, a traffic line position and a traffic line angle based on intersecting traffic line region candidate.

At this point operations performed by above described sections will be explained later in detail.

In this regard, the above described constructions from the traffic line region candidate extraction section 6 to the traffic line determination section 14 are realized by micro processors and the respective function sections are constructed of software program corresponding to their functions and hardware such as CPU, memory and so on for executing the software. Alternatively, the respective function sections may be constructed of hardware exclusive to the respective function sections.

Next, operation of the traffic line recognition device constructed in the above described manner will be described.

Figure 3:
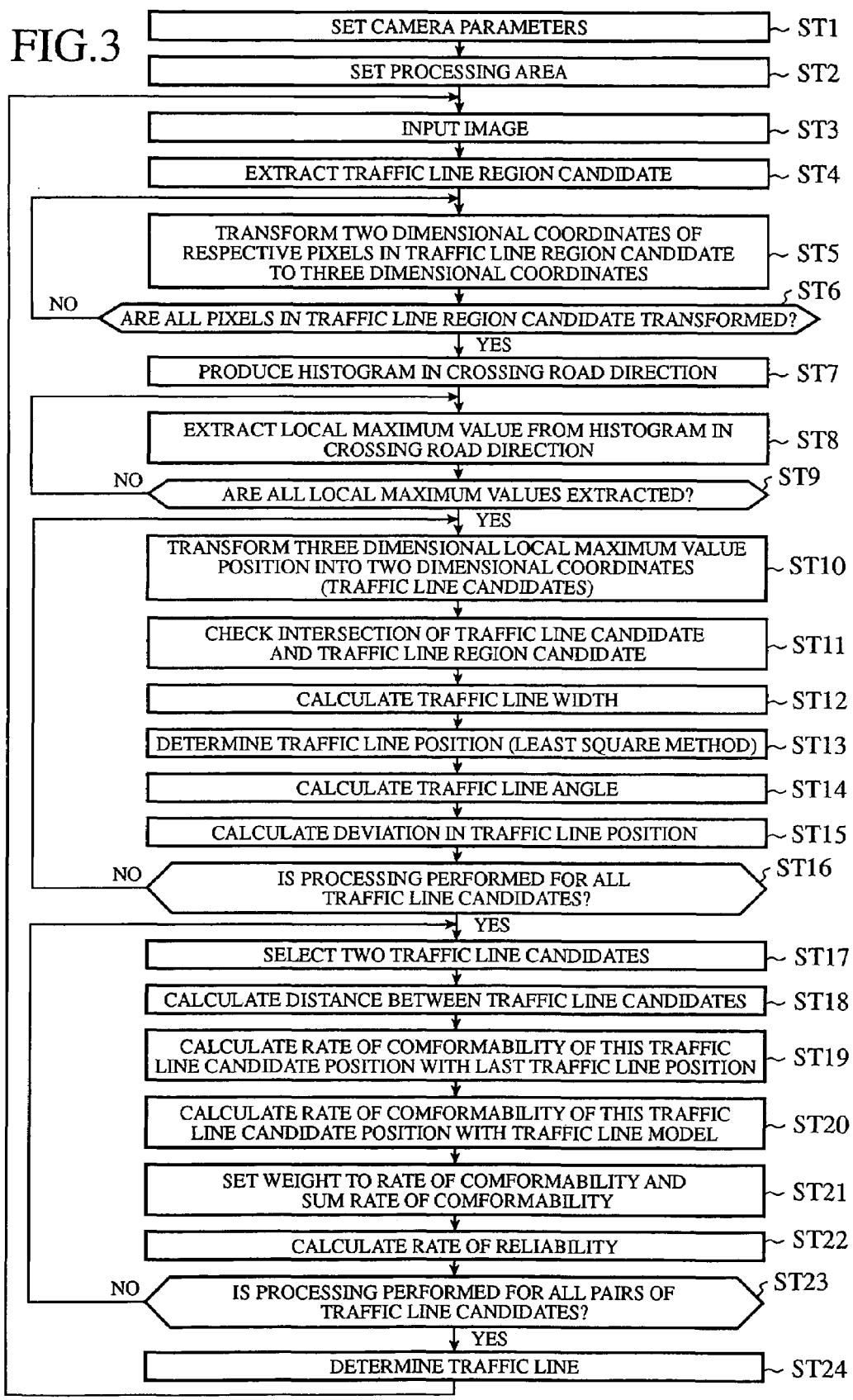
FIG. 3 is a flow chart to show the operation of the traffic line recognition device in accordance with embodiment 1 of the present invention.

FIG. 3 is a flow chart to show operation of the traffic line recognition device of this embodiment.

First, the TV camera parameter setting section 4 sets camera parameters to the two dimensions/three dimensions transform section 7 and the three dimensions/two dimensions transform section 10 (step ST1). As for the setting of the camera parameters, as described above, the camera element size, screen size, the lens focal length, and the installation position (it is assumed that level, lateral position and depth are zero) of the TV camera 1 are fixed when the camera is installed, so that these values are previously set. Further, when the vehicle is running, in a case where slope of the road surface varies on which the vehicle is running, the camera parameters are updated according to the varying slope by the TV camera parameter setting section 4, but an explanation for processing of updating a dip with respect to the road surface is omitted in the flow chart.

Figure 5:
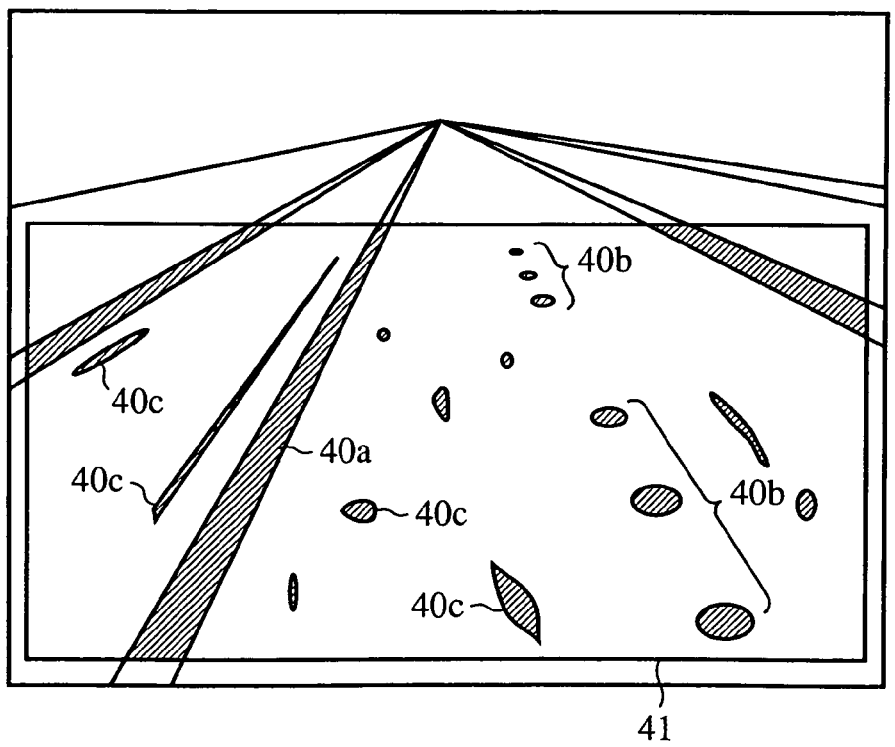
FIG. 5 is an explanatory illustration to show the extraction of a traffic line region candidate by the traffic line recognition device in accordance with embodiment 1 of the present invention.

Next, the processing area setting section 5 sets a processing area of traffic line recognition (step ST2). This processing area means an area, in which traffic line recognition process is performed for a two-dimensional image which is obtained by the TV camera 1 and, as shown in FIG. 5 on which explanation will be given later, is a predetermined area in the image obtained by the TV camera 1.

An actual traffic line recognition processing is started in a state where these camera parameters and the processing area are set. First, an image signal obtained by taking a scene of road surface in front of the vehicle by the TV camera 1 is input to the frame memory 3 (step ST3).

Figure 4:
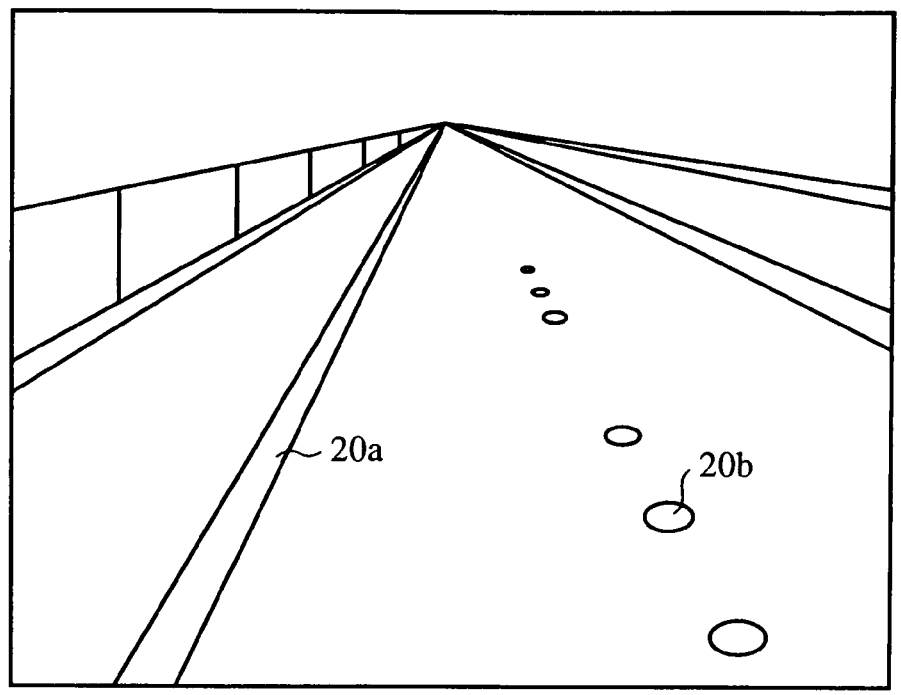
FIG. 4 is an illustration to show one example of an image obtained by a TV camera of the traffic line recognition device in accordance with embodiment 1 of the present invention.

FIG. 4 is an illustration to show one example of an image taken by the TV camera 1.

As shown in the drawing, in this embodiment, traffic line recognition is performed by the same processing method as described in the following even if a screen contains traffic line drawn with white line 20*a* and traffic line made by Botts' dots 20*b* both of which define the running lane of this vehicle. Images of this kind are taken out of the frame memory 3, for example, at every 1/30 second intervals and the traffic line recognition processing is performed on respective images.

Next, the traffic line region candidate extraction section 6 extracts a region to be a traffic line candidate from a processing area set by the processing area setting section 5 in the image taken out of the frame memory 3 (step ST4). That is, the region to be a traffic line candidate is extracted as a set of pixel in the screen which reflects a fundamental nature of traffic line that the traffic line is made on a road surface, intensity of image signal from the respective point on the traffic line is higher than other surface of the road because of white paint or road rivet, and width of the traffic line is less than a predetermined value. As a specific extraction method is used, for example, THP (Top Hat Filter) published in Mitsubishi Electric Corporation Technical Report (Vol. 74, No. 9, pp. 43-pp. 46, 2000) or the like.

FIG. 5 is an explanatory illustration to show a method for extracting a traffic line region candidate and this drawing corresponds to FIG. 4.

In the drawing, dark portions drawn by slanted lines are portions extracted as traffic line candidates because of their high signal intensity. At this point, a region inside a rectangular frame 41 is a processing area set by the processing area setting section 5. In this traffic line region candidate, not only the white line 40*a* and Botts' dots 40*b* but also noises 40*c* on the road are extracted at the same time. The two dimensions/three dimensions transform section 7 performs a processing of transforming two dimensions to three dimensions to all pixels in the traffic line region candidate on a basis of the parameters set by the TV camera parameter setting section 4 to find their three dimensional road coordinates (step ST5, step ST6).

Figure 6:
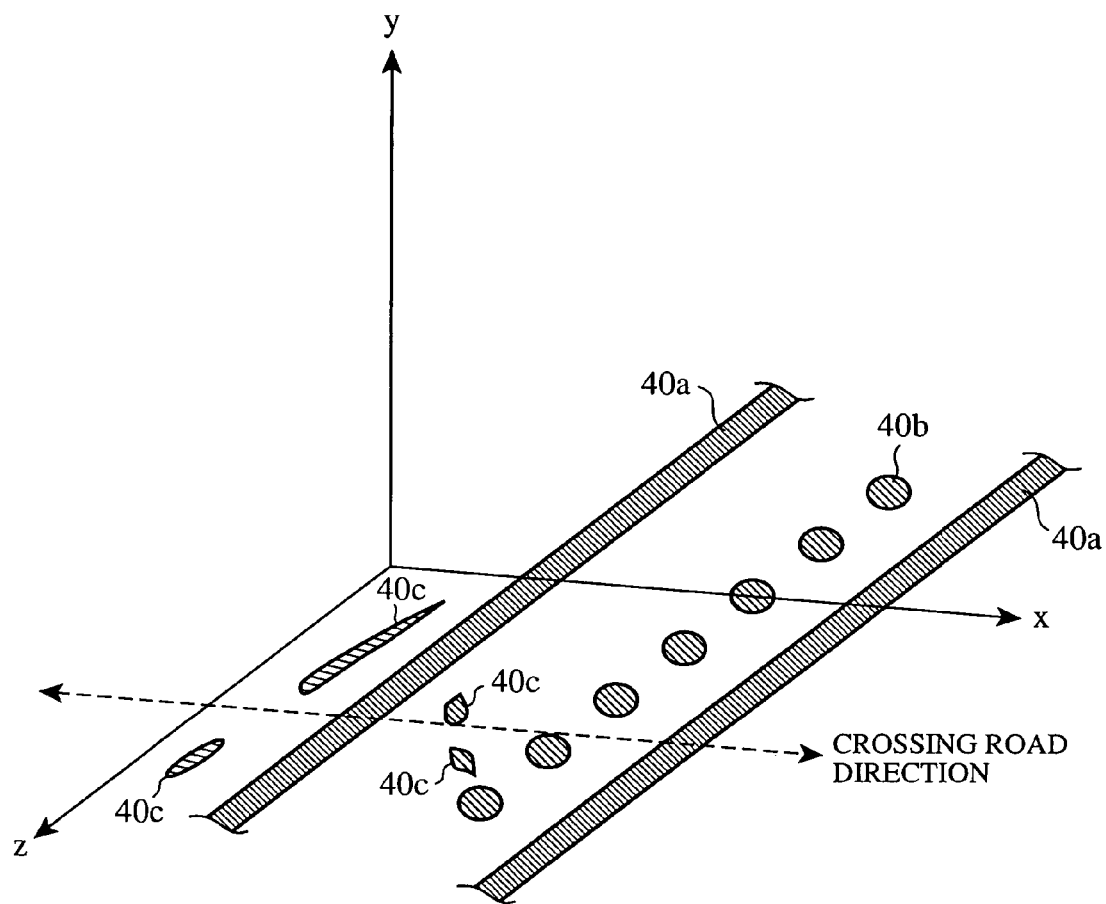
FIG. 6 is an explanatory illustration to show three dimensional road coordinates of the traffic line recognition device in accordance with embodiment 1 of the present invention.

FIG. 6 is an explanatory illustration to show a three dimensional road coordinates.

At this point, in a case where a direction crossing a road, a direction of height and a direction parallel to the road are expressed by x direction, y direction, and z direction, as shown in the drawing, the three dimensional coordinates of the respective pixels such as white lines 40*a* and Botts' dots 40*b* become lines parallel to the z direction. Here, it is assumed that the white lines 40*a*, the Botts' dots 40*b*, and the noises 40*c* are on the road surface (y=0).

The histogram production section 8 accumulates and projects the respective pixels of this three dimensional coordinate of 1 flame image to a coordinate system in a direction crossing the road to produce a histogram of pixels in the direction crossing the road (step ST7). This is equal to what shows numbers of pixels shown by slanted lines in 1 flame image of FIG. 5 as function of x for position in road crossing direction. Next, the local maximum value position extraction section 9 extracts all positions crossing the road which are local maximum values from the histogram produced by the histogram production section 8 (step ST8, step ST9).

Figure 7:
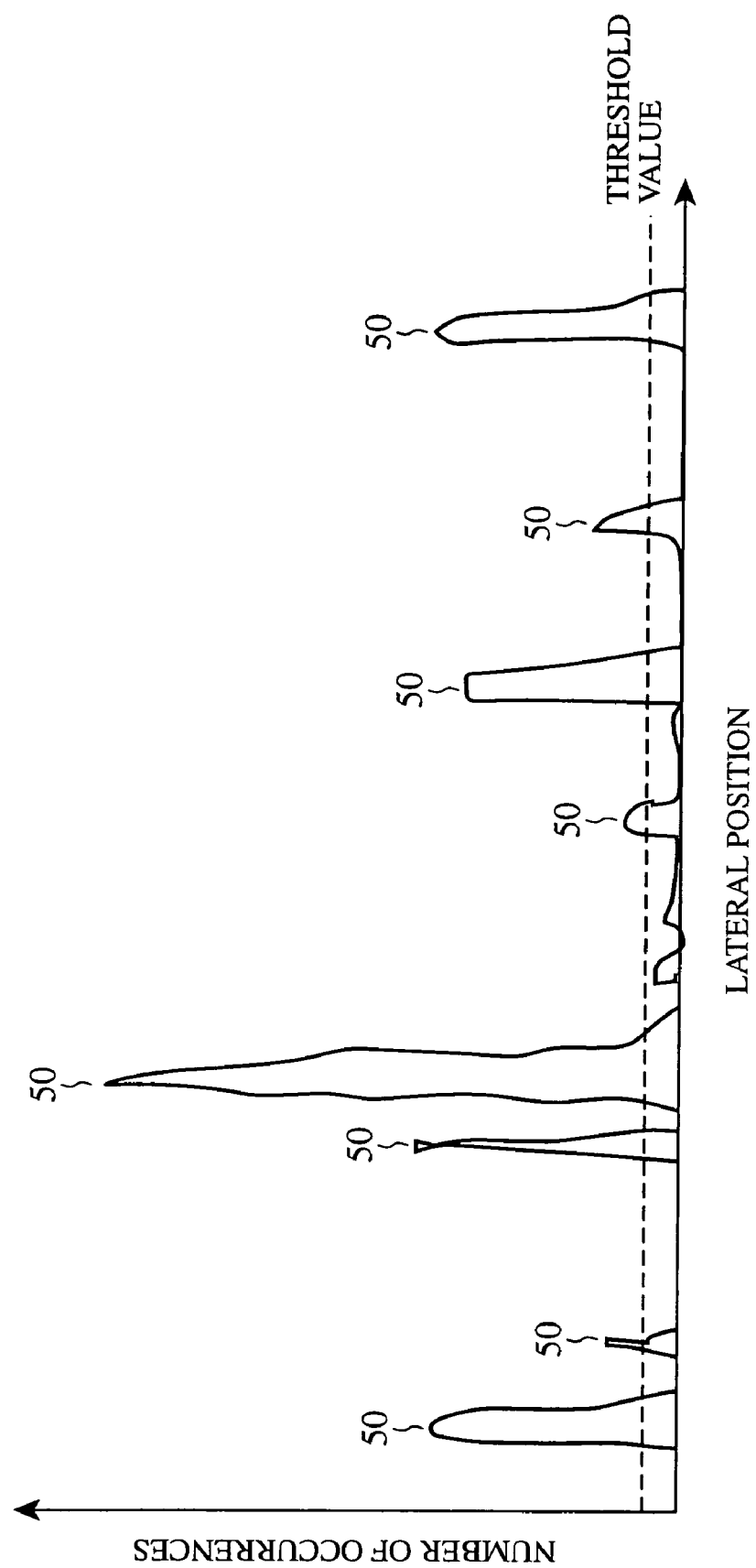
FIG. 7 is an explanatory illustration to show a method of finding a maximum value of the traffic line recognition device in accordance with embodiment 1 of the present invention.

FIG. 7 is an illustration to show a method of determining a local maximum value. A predetermined threshold value is set to a histogram in which a position in a direction crossing the road is plotted in horizontal axis and in which the number of occurrences of pixels of traffic line candidates is plotted in vertical axis. A histogram is checked one by one from left side (or right side) and a position where the number of occurrences is the largest within a range from a position where the number of occurrences becomes larger than the threshold value to a position where the number of occurrences again becomes smaller than the threshold value is extracted as a local maximum value position 50. By repeating this operation, a plurality of local maximum value positions 50 can be found.

Next, coordinates on a two dimensional screen for the respective found local maximum value positions are found by the three dimension/two dimensions transform section 10 with assuming the coordinates of two appropriate points (for example, a vehicle position and a position located 20 m forward of the vehicle) in a direction of depth on the road (step ST10). Next, the intersection region extraction section 11 finds traffic line region candidates 40*a*, 40*b*, and 40*c* intersecting a straight line connecting the two points on the screen for the respective local maximum value positions for each line (scanning line on the frame memory 3 to extract the constituent elements of lines to be traffic line candidates (step ST11). This means that a traffic line region candidate shown in FIG. 5 is checked on a basis of local maximum value position shown in FIG. 7.

Figure 8:
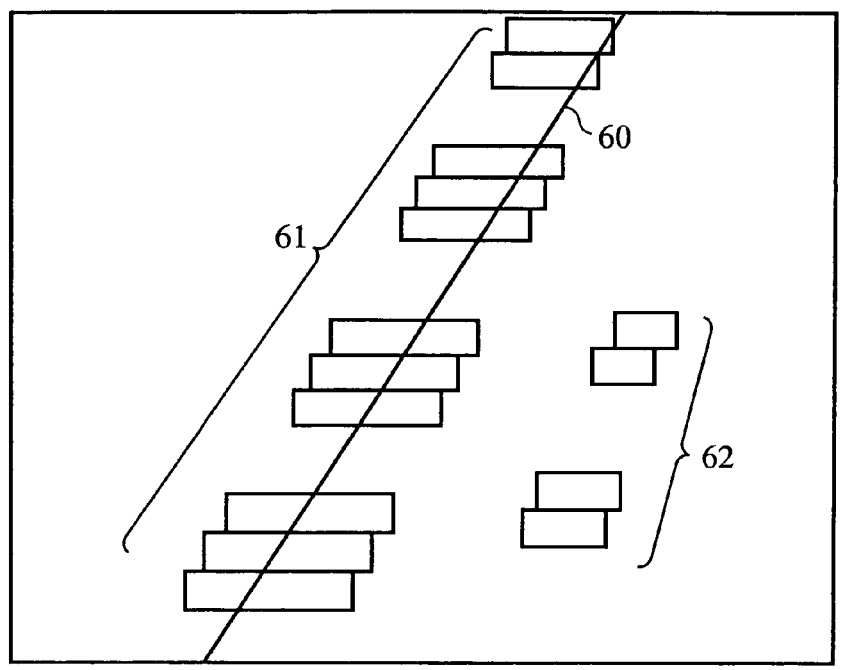
FIG. 8 is an explanatory illustration to show one example of extraction result by an intersection region extraction section of the traffic line recognition device in accordance with embodiment 1 of the present invention.

FIG. 8 is an explanatory illustration to show one example of extraction result of the intersection region extraction section 11. In the drawing, a traffic line candidate 60 is a straight line connecting the two points on the screen for the above described one of the respective local maximum value positions. An intersection region 61 shows traffic line region candidates intersecting the traffic line candidate 60 for each scanning line. In this manner, by finding only traffic line region candidates intersecting a certain straight line, regions 62 other than these can be excluded from the elements of traffic line candidate 60.

The traffic line position calculation section 12 finds three dimensional coordinates of the coordinates of left and right ends of the intersection regions 61 of the traffic line candidate 60 for the respective local maximum value positions and finds an average value of the absolute values of the differences between the coordinates, thereby finding a traffic line width (step ST12). That is, this traffic line width is a value width in a direction of road crossing direction for one traffic line such as white line or Botts' dots.

Further, the traffic line position calculation section 12 finds the three dimensional coordinates of center positions of the respective intersection regions 61 of the traffic line candidate 60 for the local maximum value positions and finds an approximate straight line for an acquired train of points, thereby finding the position and angle of a traffic line candidate (step ST13, step ST14). The least square method or the like can be used for finding the appropriate straight line.

Still further, the traffic line position calculation section 12 calculates the amount of deviation in position between the position of traffic line found at step ST13 and the position of traffic line found by the last traffic line recognition processing (step ST15). These processing from step ST10 to step ST15 are performed for all the traffic line candidates (step ST16).

Next, the rate of reliability calculation section 13 selects two arbitrary traffic lines among the traffic line candidates (approximate straight lines) found by the traffic line position calculation section 12 (step ST17) and calculates a distance between the traffic line candidates (step ST18). Further, the rate of reliability calculation section 13 calculates the rate of comformability of the found traffic line candidate position with a traffic line position found by the last traffic line recognition processing on the basis of the amount of deviation in traffic line position found at step ST15 (step ST19). Still further, the rate of reliability calculation section 13 calculates the rate of comformability of the found traffic line candidate value with a traffic line model value which is previously set (step ST20).

The calculation of the rate of comformability of the found traffic line candidate value with a traffic line model value is performed by preparing a function previously and acquiring an output value of this function.

Figure 9:
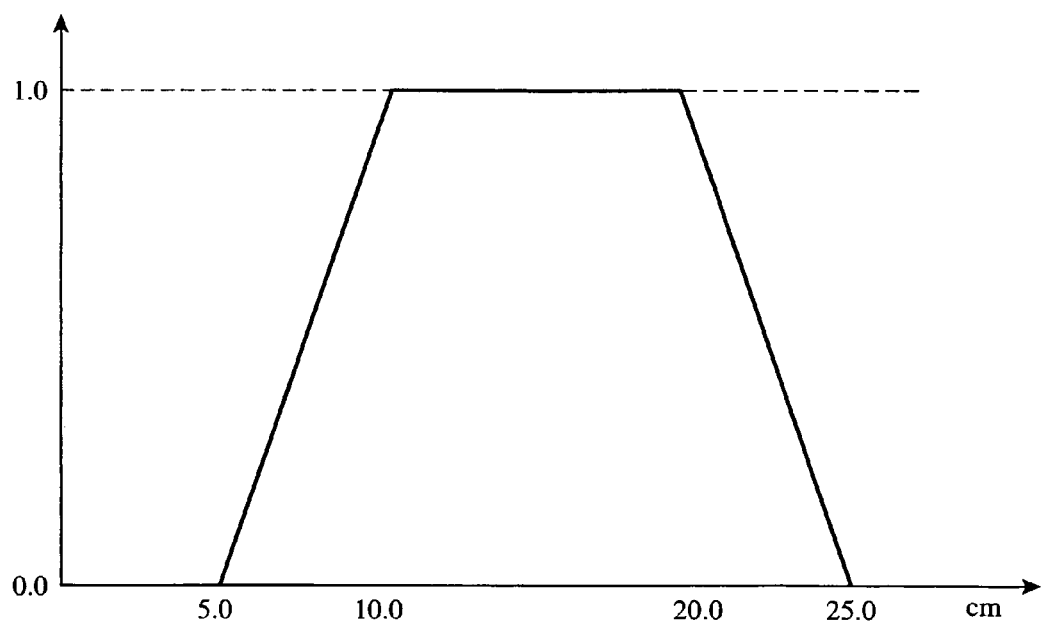
FIG. 9 is an explanatory illustration to show a function about a traffic line width of the traffic line recognition device in accordance with embodiment 1 of the present invention.

FIG. 9 is an illustration to show a function for a traffic line width. In an example of a function shown in the drawing, in a case where a traffic line width is smaller than 5 cm or larger than 25 cm, a function value of 0.0 is output; in a case where a traffic line width is from 10 cm to 20 cm, a function value of 1.0 is output; and in the other cases, for example, in the case of 8 cm, a function value of 0.6 is output. The calculation of the rate of comformability like this is performed in the same way not only for a traffic line width but also for a distance between traffic lines.

The rate of reliability calculation section 13 calculates the rate of comformability of the two arbitrary traffic line candidates in the above manner and then multiplies predetermined weights to these rates of comformability and sums the rates of comformability (step ST21). Here, elements to be summed are values of the rate of comformability of the traffic line candidate value with the traffic line model, which has been described above, and the angle of traffic line.

Moreover, the setting of weight at this step, for example, in the case of placing importance on the rate of comformability of the this found traffic line with the last found traffic line, means a processing of increasing a weight value to be set to this element of the rate of comformability and the contents of processing of setting weight are previously set according to use conditions and the like of the traffic line recognition device.

Next, the rate of reliability calculation section 13 calculates the rate of reliability of the traffic line candidate on the basis of the sum total which is found at step ST21 (step ST22). Then, the rate of reliability calculation section 13 performs these processing from step ST17 to step ST22 to all the pairs of traffic line candidates (step ST23).

Finally, the traffic line determination section 14 determines that the pair of traffic line candidates whose rate of reliability is more than a predetermined threshold value and is the highest area traffic line (step ST24). When this traffic line recognition processing is finished for one frame of image, the routine returns to step ST3 where the traffic line recognition processing is performed to the next frame and thereafter the above described processing are repeated.

In this regard, it is also recommended that the above described embodiment be constructed in such a way that the traffic line position calculation section 12 calculates not only the traffic line width, the traffic line position, and the angle of traffic line but also the number of occurrences of the maximum value in the histogram and the distance between traffic lines and the center position between traffic lines in the case of pairing of two traffic line candidates and that the rate of reliability calculation section 13 calculates the rate of reliability by using these values as elements. That is, in the histogram, the traffic line position shows a higher value in the number of occurrences than the noises, so this number of occurrences can be used as an element. Moreover, since the center position between traffic lines is not so much different from the last center position before one flame when the vehicle runs on the same traffic line, the center position between traffic lines can be also employed as an element.

Further, in the above described embodiment, as shown in FIG. 2, the TV camera 1 and an image processing unit including the frame memory 3 to the traffic line determination section 14 are integrated into a single device, but it is also recommended that the TV camera 1 and the image processing unit be installed as separate units.

Still further, while examples of white lines and Botts' dots have been described as traffic lines to be recognized in the above described embodiment, the traffic lines to be recognized are not limited to them but, for example, even a yellow traffic line can be recognized in the same way. Moreover, in a state where a traffic line is included in an image obtained by the TV camera 1, for example, even at nighttime, the traffic line can be recognized in the same way.

As described above, according to embodiment 1, there is provided a traffic line recognition device including: the traffic line region candidate extraction section for extracting a traffic line region candidate to be a traffic line candidate from a road image taken by TV camera on the vehicle; the two dimensions/three dimensions transform section for transforming two dimensional image coordinates of pixels included in the traffic line region candidate to three dimensional coordinates; the histogram production section for accumulating and projecting the three dimensional coordinates to a coordinate system in a direction crossing the road and producing a histogram in the direction crossing the road; and the traffic line judgment unit for determining a traffic line on the basis of the values of histogram. Hence, the device can be provided at low cost which can recognize a traffic line even in a road including different kinds of traffic lines such as white lines and Botts' dots without requiring a processing unit of high performance and a large amount of resources.

Further, according to embodiment 1, the traffic line judgment unit is provided with the local maximum value position extraction section for finding a local maximum value position in the histogram in the direction crossing the road and the traffic line information extraction block that extracts a traffic line region candidate having an intersection as traffic line information on the basis of the presence or absence of intersection of a traffic line candidate, which is obtained by transforming a straight line corresponding to the local maximum value position and extending in parallel to the road into image coordinates, and a traffic line region candidate for each scanning line in the direction crossing the road in the image. Therefore, all the traffic line region candidates in the image are not required to be subjected to the recognition processing, which results in saving the amount of calculation and contributing to the simplification of processing.

Still further, according to embodiment 1, the traffic line information extraction block extracts at least one or more pieces of information from among: the number of occurrences in the histogram corresponding to a traffic line candidate; a traffic line width, a traffic line position, and the angle of traffic line which are based on an intersecting traffic line region candidate; and a distance between traffic lines and a center position between traffic lines in the case of pairing of two traffic line candidates, as traffic line information. Therefore, this can improve the performance of traffic line recognition and save the amount of calculation and further contribute to the simplification of processing.

Still further, according to embodiment 1, the traffic line judgment unit includes the rate of reliability calculation section for calculating the rate of comformability of traffic line information acquired by the traffic line information extraction block with information for a traffic line acquired by the last traffic line recognition processing or with a previously set model value and for calculating the rate of reliability of the traffic line by setting a predetermined weight to the rate of comformability. Therefore, this can further improve the accuracy of traffic line recognition.

What is claimed is:

1. A traffic line recognition device comprising:
   an image obtaining section for obtaining a two-dimensional road image of a road surface in front of a vehicle;
   an image obtaining parameter setting section for setting parameters of the image obtaining section, including dip value with respect to the road surface, and automatically updating the dip value while the vehicle is moving;
   a traffic line region candidate extraction section for extracting a traffic line region candidate, as a traffic line candidate, from the two-dimensional road image obtained by the image obtaining section installed on the vehicle, based on relative signal intensities of respective pixels within the road image, wherein
   the intensities of respective pixels of the road image for traffic line region candidates are higher than intensities of other pixels of the road image, and
   width of a traffic line region candidate in the road image is smaller than a predetermined width;
   a two-dimension/thee-dimension transform section for transforming two-dimensional image coordinates of a pixel within the traffic line region candidate to three-dimensional coordinates based on the parameters set by the image obtaining parameter setting section;
   a histogram production section for accumulating and projecting the three-dimensional coordinates onto a coordinate system in a direction crossing the road, and producing a histogram in the direction crossing the road; and
   a traffic line judgment unit for determining a traffic line based on a value of the histogram.

2. The traffic line recognition device as claimed in claim 1, wherein the traffic line judgment unit includes:
   a local maximum value position extraction section for finding position of a local maximum value in the histogram in the direction crossing the road; and
   a traffic line information extraction block for extracting a traffic line region candidate having an intersection as traffic line information, based on presence or absence of an intersection of (i) a traffic line candidate acquired by transforming a straight line corresponding to the position of the local maximum value and extending parallel to the road into image coordinates, and (ii) a traffic line region candidate for each scanning line in the direction crossing the road in an image.

3. The traffic line recognition device as claimed in claim 2, wherein the traffic line information extraction block extracts at least one item of information from among:
   the number of occurrences in the histogram corresponding to the traffic line candidate;
   traffic line width, traffic line position, and angle of traffic line, based on the traffic line region candidate having an intersection; and
   distance between traffic lines and a center position between traffic lines, when pairing two traffic line candidates, as traffic line information.

4. The traffic line recognition device as claimed in claim 3, wherein the traffic line judgment unit includes a rate of reliability calculation section for calculating rate of conformability of traffic line information acquired by the traffic line information extraction block with one of (i) information for a traffic line acquired by the last traffic line recognition processing, and (ii) a previously set model value, and for calculating the rate of reliability of the traffic line by weighting the rate of conformability.

* * * * *